(12) United States Patent
Hung et al.

(10) Patent No.: US 8,959,379 B2
(45) Date of Patent: Feb. 17, 2015

(54) THERMAL PROTECTION METHOD FOR COMPUTER SYSTEM AND DEVICE THEREOF

(75) Inventors: Yi-Chun Hung, New Taipei (TW);
Nien-Shang Chao, New Taipei (TW);
Yu-Hsien Ku, New Taipei (TW);
Bing-Hung Wang, New Taipei (TW);
Wei-Chiang Tsou, New Taipei (TW)

(73) Assignee: Wistron Corporation, Hsichih, New Taipei (TW)

( * ) Notice: Subject to any disclaimer, the term of this patent is extended or adjusted under 35 U.S.C. 154(b) by 469 days.

(21) Appl. No.: 13/449,325

(22) Filed: Apr. 18, 2012

(65) Prior Publication Data
US 2013/0024715 A1    Jan. 24, 2013

(30) Foreign Application Priority Data
Jul. 18, 2011    (TW) .............................. 100125277 A

(51) Int. Cl.
*G06F 1/08* (2006.01)
*G06F 1/20* (2006.01)
*G06F 9/50* (2006.01)
*G06F 1/32* (2006.01)

(52) U.S. Cl.
CPC .............. *G06F 1/206* (2013.01); *G06F 1/3203* (2013.01); *G06F 9/5094* (2013.01); *Y02B 60/1217* (2013.01); *G06F 2209/501* (2013.01)
USPC ........... 713/501; 713/400; 713/401; 713/500; 713/503; 713/300; 713/320; 713/321; 713/322; 713/323; 713/324

(58) Field of Classification Search
USPC ......... 713/300, 320–324, 400–401, 500–503, 713/600–601
See application file for complete search history.

(56) References Cited

U.S. PATENT DOCUMENTS 6,901,524 B2 * 5/2005 Watts, Jr. ...................... 713/322
7,389,438 B2 * 6/2008 Watts, Jr. ...................... 713/323
(Continued)

FOREIGN PATENT DOCUMENTS

| CN | 1622046 A | 6/2005 |
| CN | 101241392 A | 8/2008 |
| TW | 200419326 | 10/2004 |

OTHER PUBLICATIONS

Office action mailed on Nov. 13, 2013 for the Taiwan application No. 100125277, filing date: Jul. 18, 2011, p. 1 line 1, 8, 11~13, 17~30, p. 2~5 and p. 6 line 1~7.

(Continued)

*Primary Examiner* — M Elamin
(74) *Attorney, Agent, or Firm* — Winston Hsu; Scott Margo

(57) ABSTRACT

A thermal protection method for a computer system including at least a processor includes monitoring the temperature and loading of the processor via a system firmware in the computer system, obtaining the current performance state level and at least an operable performance state levels of the processor when the system firmware determines that the temperature and loading of the processor exceeds a predetermined value respectively, wherein the performance state level is associated to the frequency of the processor, and setting the processor to one of the operable performance state levels, wherein the frequency of the performance state level is lower than the frequency of the current performance state level, according to the current performance state level and the operable performance state levels.

9 Claims, 2 Drawing Sheets

(56) References Cited

U.S. PATENT DOCUMENTS

| | | | |
|---|---|---|---|
| 8,225,121 B2* | 7/2012 | Sotomayor et al. | 713/323 |
| 2003/0201741 A1 | 10/2003 | Lee | |
| 2005/0223255 A1* | 10/2005 | Watts | 713/322 |
| 2007/0250219 A1 | 10/2007 | Gaskins | |
| 2007/0250736 A1 | 10/2007 | Gaskins | |
| 2007/0255972 A1 | 11/2007 | Gaskins | |
| 2008/0036613 A1 | 2/2008 | Gaskins | |
| 2009/0177907 A1* | 7/2009 | Sotomayor et al. | 713/340 |
| 2010/0049995 A1* | 2/2010 | Casey et al. | 713/300 |
| 2011/0219247 A1* | 9/2011 | Sotomayor et al. | 713/320 |

OTHER PUBLICATIONS

Office action mailed on Jun. 26, 2014 for the China application No. 201110215035.3, p. 3~5.

Office action mailed Mar. 25, 2014 for the Taiwan application No. 100125277, filing date: Jul. 18, 2011, p. 2~3.

* cited by examiner

THERMAL PROTECTION METHOD FOR COMPUTER SYSTEM AND DEVICE THEREOF

BACKGROUND OF THE INVENTION

1. Field of the Invention

The present invention relates to a thermal protection method for a computer system and a device thereof, and more particularly, to a thermal protection method for a computer system and a device thereof via a software way to lower a temperature of a computer system.

2. Description of the Prior Art

As the advancement of computer calculation, 3C products have been led to provide a user-friendly interface and multi-functionality, in the meanwhile, heat emitted from a processor, such as a central processing unit (CPU) or a graphic process unit (GPU), gets increase as the capability of the data calculation increases. However, if the processor continuously operates within a high temperature state, operation of the processor will be unstable and lifetime of the processor will be shorten. Therefore, with the enhanced efficiency of the processor, heat dissipation and thermal protection of a computer system seem to be more important. Currently, general ways to dissipate heat include heat dissipating fans and heat sinks, etc. Heat dissipating fans removes heat generated by the processor based on the theory of air circulation. In comparison, heat sinks conduct heat away from the processor based on the thermal conductivity of material. However, operation of the heat dissipating fans or the heat sinks has their limits on effectively dissipating heat. Like the heat dissipating fans, the heat gets accumulation inside a closed environment because of internal air circulation. Moreover, it is easy for the heat dissipating fans to pile up dust, resulting in shutdown of the heat dissipating fans eventually if ones neglect regular cleaning. On the other hand, since the heat sinks connect with the processor via dissipating paste, tightness between the heat sink and the processor has great influence on heat dissipation.

Furthermore, methods for improving heat dissipating as well as avoiding overheating of the computer system further include designs or sizes of a housing, location of inlets or exhausting ports on a housing, capacity of power supply fans, location of vents or processor slots and arrangement of extension cards or cables. However, those methods mentioned above lower the temperature of the computer system by mechanical designs, and thereby heat dissipating efficiency is limited and unable to fulfill expectation of users.

SUMMARY OF THE INVENTION

It is therefore an objective of the present invention to provide a thermal protection method for a computer system.

The present invention discloses a thermal protection method for a computer system comprising at least a processor. The thermal protection method comprises monitoring a temperature and a loading of the processor via a system firmware in the computer system, obtaining a current performance state level and at least one operable performance state level of the processor when the system firmware determines that the temperature of the processor exceeds a first predetermined value and the loading of the processor exceeds a second predetermined value, wherein the performance state level is associated to a frequency of the processor, and setting the processor to a first performance state level being one of the operable performance state levels, according to the performance state level and the operable performance state levels, wherein the frequency of the first performance state level is lower than the frequency of the performance state level, to lower the temperature of the computer system.

The present invention further discloses a computer system equipped with a thermal protection function. The computer system comprises at least a processor, for controlling operation of the computer system, and a system firmware coupled to the processor, for monitoring a temperature and a loading of the processor, to obtain a current performance state level and at least one operable performance state level of the processor when determining the temperature of the processor exceeds a first predetermined value and the loading of the processor exceeds a second predetermined value, wherein the performance state level is associated to a frequency of the processor, and setting the processor to a first performance state level being one of the operable performance state levels, according to the performance state level and the operable performance state levels, wherein the frequency of the first performance state level is lower than the frequency of the performance state level, to lower the temperature of the computer system.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
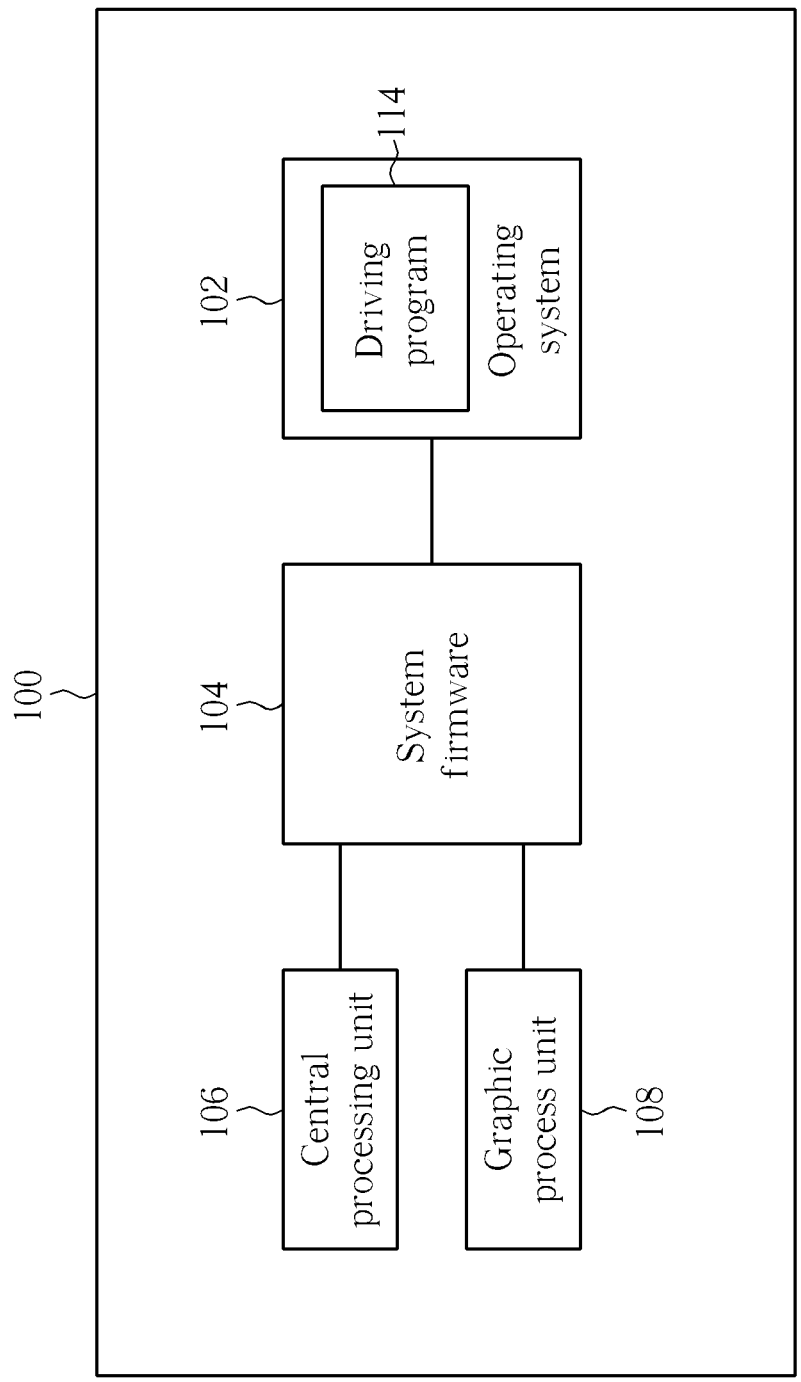
FIG. 1 illustrates a block diagram of a computer system according to an embodiment of the present invention.

Please refer to FIG. 1, which illustrates a block diagram of a computer system 100 according to an embodiment of the present invention. The computer system 100 may be a notebook, a personal computer or any system which is similar to the computer system. The computer system 100 includes an operating system (OS) 102, a system firmware 104, a central processing unit (CPU) 106 and a graphic process unit (GPU) 108. The CPU 106 and the GPU 108 are utilized for controlling operation of the computer system 100. Those skills in the art are familiar with the operation, which is not narrated hereinafter. The system firmware 104 is utilized for monitoring a temperature and a loading of the CPU 106 and/or the GPU 108, obtaining a frequency as well as an operable performance state level of the CPU 106 and/or the GPU 108, and setting the CPU 106 and/or the GPU 108 into a performance state level of the operable performance state levels when the temperature and/or the loading of the CPU 106 and/or the GPU 108 exceeds a predetermined value. The OS 102 includes a driving program 114 to control the frequency of the CPU 106 and/or the GPU 108 according to the system firmware 104 to set the performance state levels of the CPU 106 and/or the GPU 108.

Noticeably, the performance state level is related to the operating frequency of a processor (e.g. the CPU 106). In general, the CPU 106 includes many performance state levels, i.e. the operable performance state levels. In a circumstance, the processor has no needs to operate at a highest frequency, and can alternatively operate under a lower frequency compared to the current operating frequency. Therefore, the processor can be set into a lower performance state level to lower power consumption and the temperature. Besides, the system firmware 104 can be programs in the basic input output system (BIOS) and the embedded controller (EC), which is not limited hereinafter.

Figure 2:
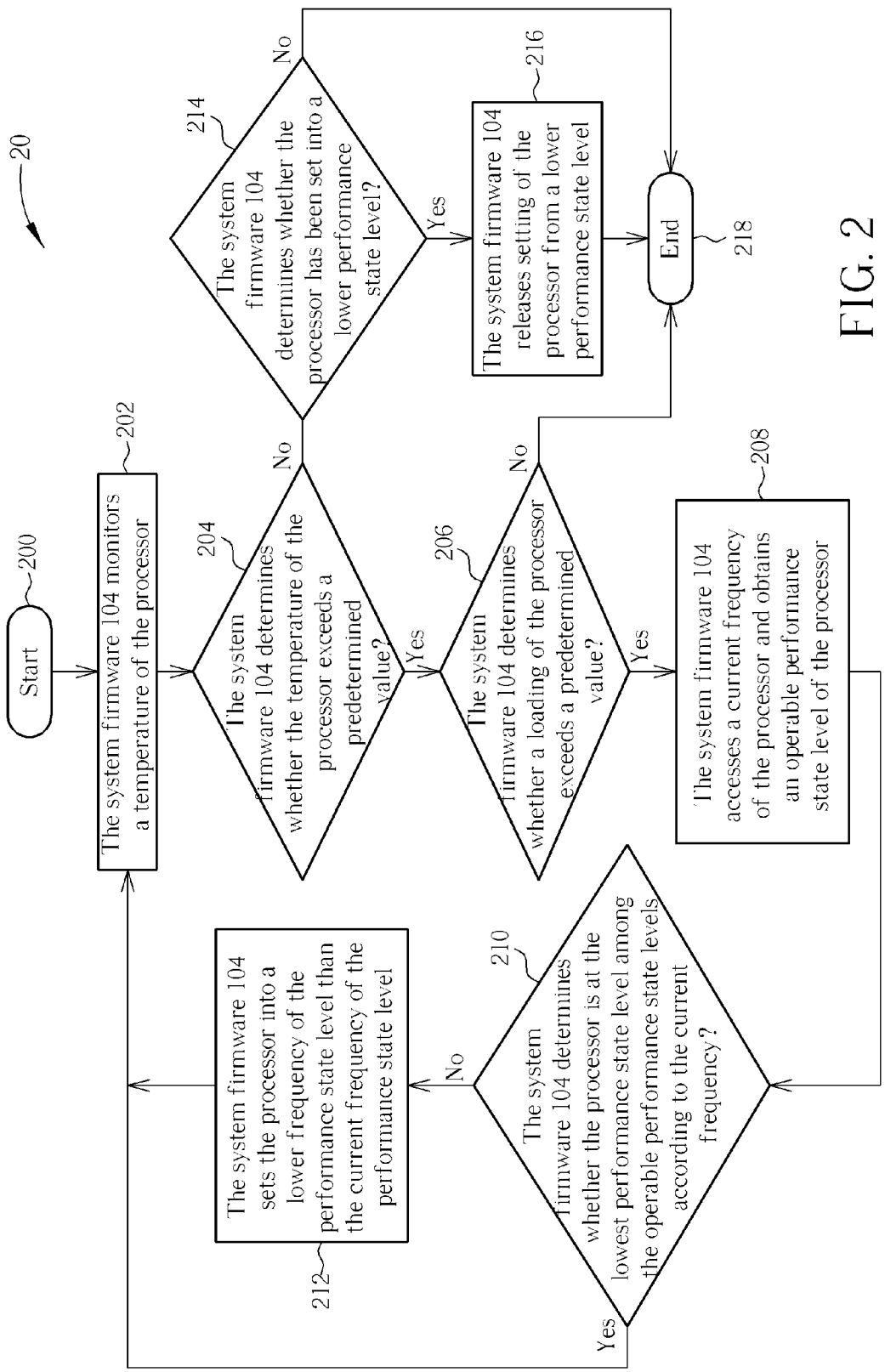
FIG. 2 illustrates a schematic diagram of a thermal protection process according to an embodiment of the present invention.

Please refer to FIG. 2, which illustrates a schematic diagram of a thermal protection process 20 according to an embodiment of the present invention. The thermal protection process 20 is utilized in the computer system 100 as shown in FIG. 1, and includes the following steps:

Step 200: Start.

Step 202: The system firmware 104 monitors a temperature of the processor.

Step 204: The system firmware 104 determines whether the temperature of the processor exceeds a predetermined value. If the temperature of the processor exceeds the predetermined value, process Step 206. If the temperature of the processor does not exceed the predetermined value, process Step 214.

Step 206: The system firmware 104 determines whether a loading of the processor exceeds a predetermined value. If the loading of the processor exceeds the predetermined value, process Step 208. If the loading of the processor does not exceed the predetermined value, process Step 218.

Step 208: The system firmware 104 accesses a current frequency of the processor and obtains an operable performance state level of the processor.

Step 210: The system firmware 104 determines whether the processor is at the lowest performance state level among the operable performance state levels according to the current frequency. If the processor is at the lowest performance state level, process Step 202. If the processor is not at the lowest performance state level, process Step 212.

Step 212: The system firmware 104 sets the processor into a lower frequency of the performance state level than the current frequency of the performance state level, and then processes Step 202.

Step 214: The system firmware 104 determines whether the processor has been set into a lower performance state level. If the processor has been set into a lower performance state level, process Step 216. If the processor has not been set into a lower performance state level, process Step 218.

Step 216: The system firmware 104 releases setting of the processor from a lower performance state level.

Step 218: End.

According to the thermal protection process 20, the system firmware 104 monitors the temperature of the processor, such as the CPU 106 and/or the GPU 108. When the temperature of the processor is determined to exceed the predetermined value, such as 70° C. or 80° C., the system firmware 104 then determines whether the loading of the processor exceeds the predetermined value. If the loading of the processor exceeds the predetermined value, the system firmware 104 accesses the current frequency of the processor to obtain the current performance state level of the processor, and to obtain the operable performance state levels of the processor. Next, the system firmware 104 sets the frequency of the processor into another performance state level whose frequency is lower than the frequency of the current performance state level, to lower the power consumption and the temperature of the processor and the computer system. Noticeably, those mentioned predetermined values are set as the thresholds for determining whether the processor overheats and/or overloads, and are related to hardware specs and user requirement of the computer systems rather than confined to a particular value.

Furthermore, before the system firmware 104 lowers the frequency of the processor according to the performance state level, the system firmware 104 needs to determine whether the current performance state level is the lowest performance state level among the operable performance state levels. If the current performance state level has been the lowest performance state level, the system firmware 104 is unable to lower the performance state level, and keeps monitoring the temperature and the loading of the processor. Contrarily, if the current performance state level is not the lowest performance state level, the system firmware 104 sets the processor into another lower performance state level and maintains to monitor the temperature of the processor. When the temperature of the processor does not exceed the predetermined value mentioned from the above, the system firmware 104 releases the setting of the processor from the lower performance state level, to avoid affecting operation of the computer system as the processor still maintains at the lower performance state level.

For example, the performance state level of the processor is currently set to $P_0$, and the operable performance state levels of the processor are $P_0$-$P_7$, wherein frequencies of the performance state levels from high to low are $P_0$, $P_1$, $P_2$, $P_3$, $P_4$, $P_5$, $P_6$, $P_7$. Therefore, according to the thermal protection process 20, when the temperature and the loading of the processor exceed the predetermined values mentioned above, the system firmware 104 sets the performance state level of the processor from the performance state level $P_0$ to the performance state level $P_1$, and keeps monitoring the temperature and the loading of the processor. If the temperature and the loading of the processor still exceed the predetermined values, the system firmware 104 sets the performance state level of the processor from the performance state level $P_1$ to the performance state level $P_2$ and so on. On the other hand, if the performance state level of the processor is or has been set to the performance state level $P_7$, the system firmware 104 keeps monitoring the temperature and the loading of the processor.

The above example provides ways to realize releasing the processor from the lower performance state level and can be described as follows. When the system firmware 104 sets the processor into a lower performance state level, such as the performance state level $P_1$, the system firmware 104 simultaneously initiates a timer to release the setting of the processor from the performance state level $P_1$ according to a timing state of the timer. In detail, assuming that the timer is set to 5 seconds, the system firmware 104 can release the setting of the processor from the performance state level $P_1$ when the timer expires, such that the processor can be set into different performance state levels according to different requirement, such as a higher performance state level $P_0$, to avoid the frequency of the processor having been maintained at one particular performance state level, thereby resulting in poor operation of the computer system. Besides, after the system firmware 104 sets the processor to the performance state level $P_1$, if the system firmware 104 detects that the temperature of the processor is lower than the predetermined value, such as 40° C., the system firmware 104 actively releases the setting of the processor from the performance state level $P_1$.

Briefly, when the processor, such as the CPU 106 and/or the GPU 108, overheats and overloads, the embodiment of the present invention utilizes the system firmware 104 dynamically lowers the performance state level of the CPU 106 and/or the GPU 108, to lower the frequency of the processor, so as to lower power consumption and temperature of the computer system.

In summary, the present invention discloses a method via a software/firmware way to maintain the balance between effective operation and heat dissipation of the computer system, avoiding the computer system from breaking down due to effects of high efficient operation accompanying with overheating, so as to lower power consumption of the computer system.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A thermal protection method for a computer system comprising at least a processor comprises:
   monitoring a temperature and a loading of the processor via a system firmware in the computer system;
   obtaining a current performance state level and at least one operable performance state level of the processor when the system firmware determines that the temperature of the processor exceeds a first predetermined value and the loading of the processor exceeds a second predetermined value, wherein the performance state level is associated to a frequency of the processor;
   determining whether frequency of the performance state level is the lowest among the frequency of the operable performance state levels according to the performance state level and the operable performance state levels; and
   keeping on monitoring the temperature and the loading of the processor when frequency of the performance state level is the lowest among the frequency of the operable performance state levels, or setting the processor to a first performance state level when the frequency of the performance state level is not the lowest among the frequency of the operable performance state levels, wherein the first performance state level is one of the operable performance state levels, and the frequency of the first performance state level is lower than the frequency of the performance state level, so as to lower the temperature of the computer system.

2. The thermal protection method of claim 1, further comprising:
   determining whether the processor is set to the first performance state level when the temperature of the processor does not exceed the first predetermined value; and
   releasing the processor from being set to the first performance state level when the temperature of the processor does not exceed the first predetermined value and the processor is set to the first performance state level.

3. The thermal protection method of claim 2, wherein the step of releasing the processor from being set to the first performance state level when the temperature of the processor does not exceed the first predetermined value and the processor is set to the first performance state level comprises:
   releasing the processor from being set to the first performance state level via a running state of a timer when the processor is set to the first performance state level; and
   actively releasing the processor from being set to the first performance state level when the processor is set to the first performance state level and the temperature of the processor is lower than a threshold.

4. The thermal protection method of claim 1, wherein each performance state level of the operable performance state levels is associated to the different frequency of the processor.

5. A computer system equipped with a thermal protection function comprises:
   at least a processor, for controlling operation of the computer system; and
   a system firmware coupled to the processor, for monitoring a temperature and a loading of the processor, to obtain a current performance state level and at least one operable performance state level of the processor when determining the temperature of the processor exceeds a first predetermined value and the loading of the processor exceeds a second predetermined value, wherein the performance state level is associated to a frequency of the processor; determining whether frequency of the performance state level is the lowest among the frequency of the operable performance state levels according to the performance state level and the operable performance state levels; and keeping on monitoring the temperature and the loading of the processor when frequency of the performance state level is the lowest among the frequency of the operable performance state levels, or setting the processor to a first performance state level when the frequency of the performance state level is not the lowest among the frequency of the operable performance state levels, wherein the first performance state level is one of the operable performance state levels, and the frequency of the first performance state level is lower than the frequency of the performance state level, so as to lower the temperature of the computer system.

6. The computer system of claim 5, wherein the system firmware is further utilized for determining whether the processor is set to the first performance state level when the temperature of the processor does not exceed the first predetermined value and releasing the processor from being set to the first performance state level when the temperature of the processor does not exceed the first predetermined value and the processor is set to the first performance state level.

7. The computer system of claim 6, wherein the system firmware is further utilized for releasing the processor from being set to the first performance state level via a running state of a timer when the processor is set to the first performance state level, or to actively releasing the processor from being set to the first performance state level when the processor is set to the first performance state level and the temperature of the processor is lower than a threshold.

8. The computer system of claim 5, wherein the system firmware comprises a basic input output system (BIOS) and an embedded controller (EC).

9. The computer system of claim 5, wherein each performance state level of the operable performance state levels is associated to the different frequency of the processor.

* * * * *